United States Patent
Lich et al.

(10) Patent No.: US 7,502,152 B2
(45) Date of Patent: Mar. 10, 2009

(54) DEVICE FOR PROJECTING AN OBJECT IN A SPACE INSIDE A VEHICLE

(75) Inventors: Thomas Lich, Schwaikheim (DE); Frank Mack, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 10/524,230

(22) PCT Filed: May 28, 2003

(86) PCT No.: PCT/DE03/01737

§ 371 (c)(1),
(2), (4) Date: Feb. 9, 2005

(87) PCT Pub. No.: WO2004/046785

PCT Pub. Date: Jun. 3, 2004

(65) Prior Publication Data

US 2005/0251395 A1     Nov. 10, 2005

(30) Foreign Application Priority Data

Nov. 16, 2002   (DE) ................. 102 53 502

(51) Int. Cl.
*G03H 1/00* (2006.01)
*G10L 21/00* (2006.01)

(52) U.S. Cl. .............. 359/13; 359/15; 359/19; 704/275

(58) Field of Classification Search .......... 359/13, 359/15, 19
See application file for complete search history.

(56) References Cited

U.S. PATENT DOCUMENTS

| | | | |
|---|---|---|---|
| 3,632,181 A * | 1/1972 | Lee | ........... 359/26 |
| 6,236,968 B1 | 5/2001 | Kanevsky | |
| 2002/0003571 A1 | 1/2002 | Schofield et al. | |
| 2002/0120554 A1 | 8/2002 | Vega | |
| 2002/0154349 A1 | 10/2002 | Halldorsson et al. | |
| 2005/0192730 A1* | 9/2005 | Churchill et al. | ........... 701/45 |

FOREIGN PATENT DOCUMENTS

| | | |
|---|---|---|
| EP | 893308 | 1/1999 |
| JP | 9035177 | 2/1997 |
| JP | 11037766 | 2/1999 |
| JP | 2002218971 | 2/2004 |

OTHER PUBLICATIONS

Simon, Michael, "HALs Kleiner ADAC Freund" translation "HAL's Little ADAC [German Automobile Association] Friend—The Virtual Passenger", Jul. 19, 2001, 3 pages, http://www.heise.de/tp/r4/artikel/9/9106/1.html—(translation of article is attached).

Huebschman et al., "Dynamic holographic 3-D image projection", Mar. 10, 2003, vol. 11, No. 5, pp. 437-445, Optics Express.

* cited by examiner

*Primary Examiner*—Fayez G Assaf
(74) *Attorney, Agent, or Firm*—Kenyon & Kenyon LLP

(57) ABSTRACT

A device for projecting an object in a space of a vehicle is described. This object is preferably projected holographically, and a voice input and output system is assigned to this object. An artificial passenger is thus created for a driver.

16 Claims, 2 Drawing Sheets

Fig. 1
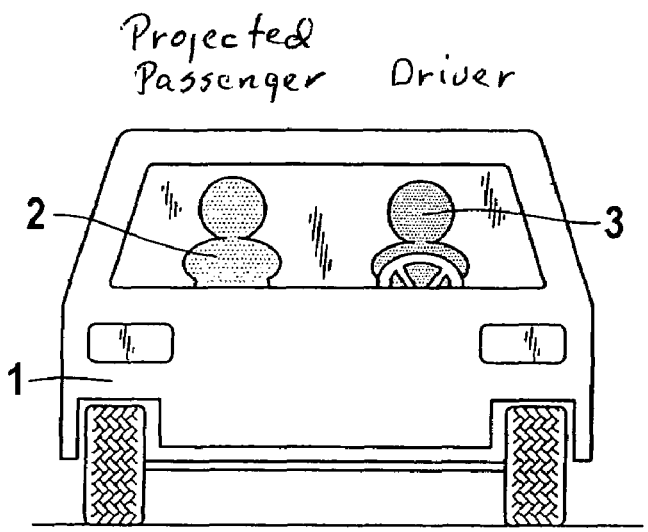
Projected Passenger    Driver
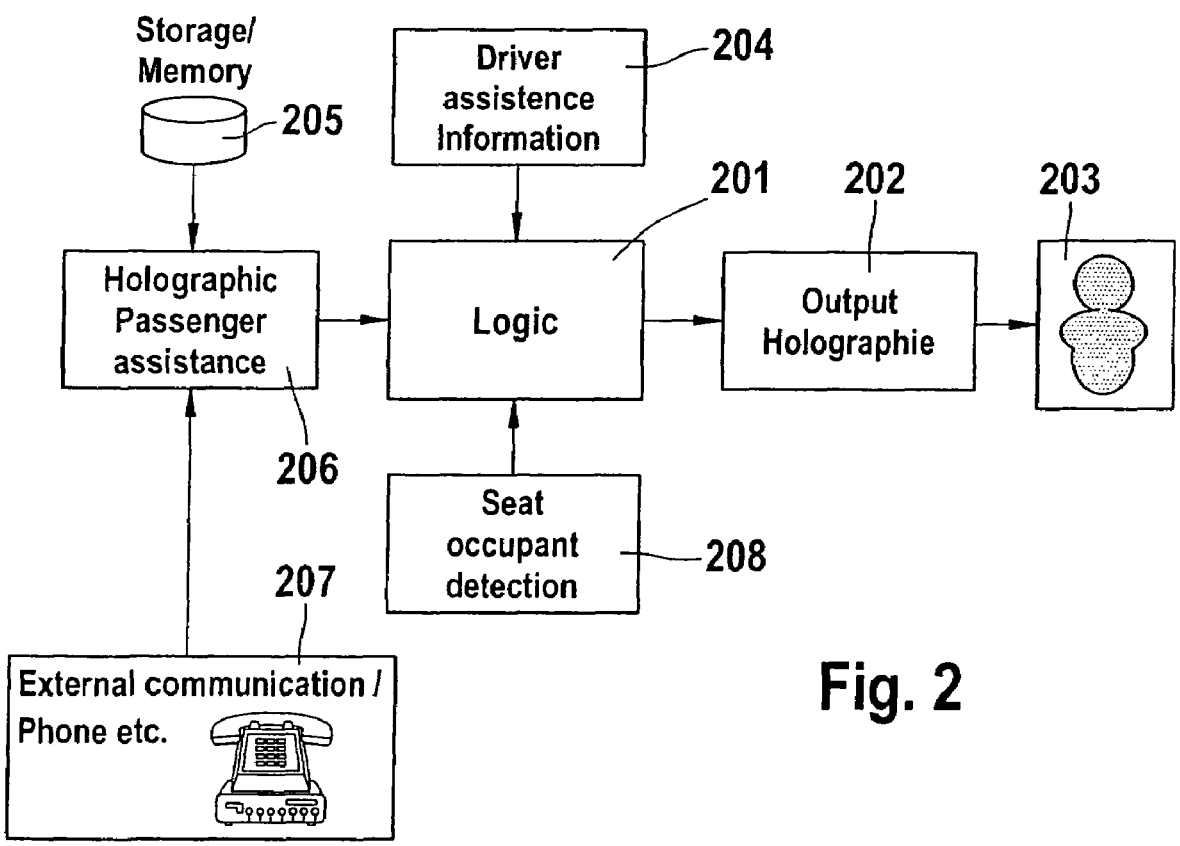
Fig. 2

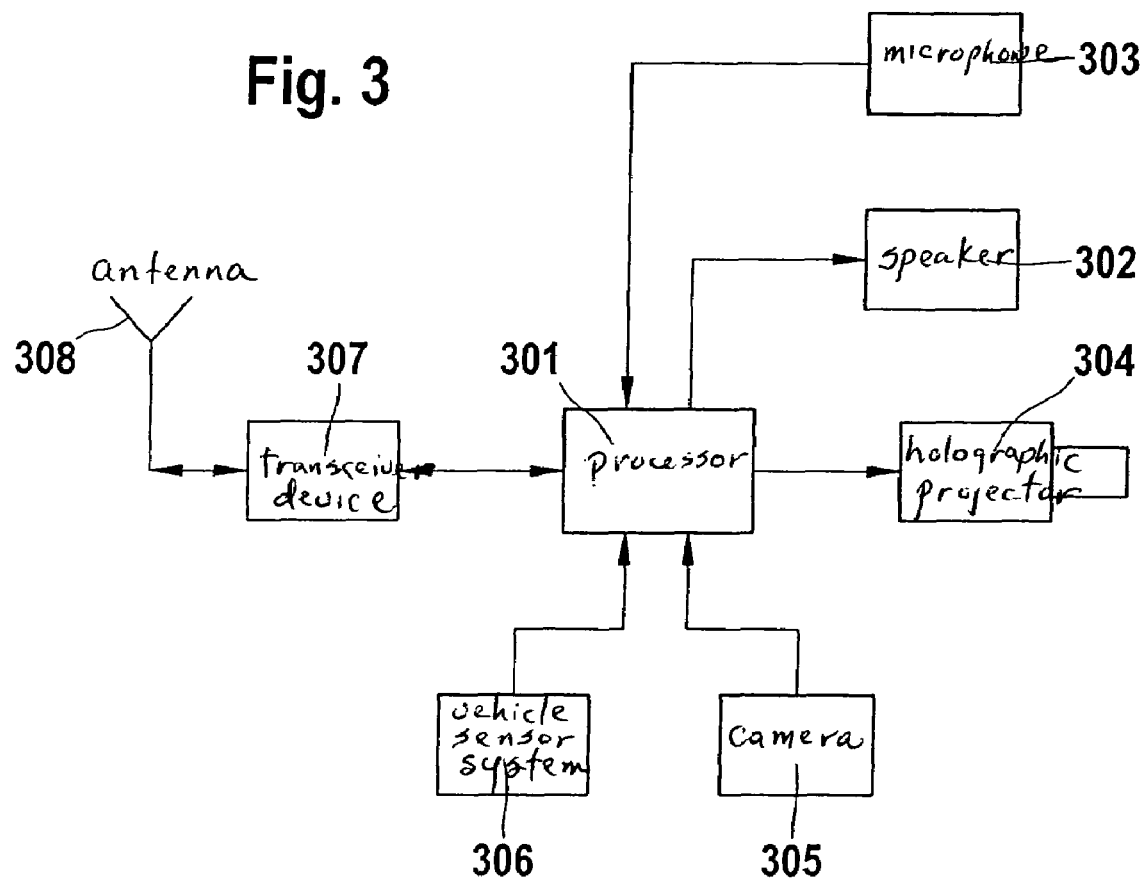

DEVICE FOR PROJECTING AN OBJECT IN A SPACE INSIDE A VEHICLE

BACKGROUND OF THE INVENTION

1. Field of the Invention

The present invention is directed to a device for projecting an object in a space of a vehicle.

2. Description of Related Art

U.S. Pat. No. 6,236,968 describes an automatic dialog system which helps a driver remain alert by conducting a conversation with the driver on different topics. For this purpose, the system has a voice recognition module and a speech generating module. Speech synthesis or stored speech may be used for this purpose.

SUMMARY OF THE INVENTION

It is an object of the invention to project an object in a space of a vehicle, which displays an object artificially.

These and other objects of the invention are achieved by artificially displaying an object which can be an artificial figure, an animal, or another creature-like representation, such as fantasy creatures. An object may also be displayed using this device. The driver is thus provided with an artificial companion and a helper in a very intuitive manner. Space in this context refers to the passenger compartment. By displaying animals, mythical creatures, or objects, a pleasant environment may be created for the driver, so that a human voice or directly addressing a person may be dispensed with, and the driver's attention may also be drawn to different driving situations by the barking of a dog, for example.

BRIEF DESCRIPTION OF THE DRAWINGS

The invention will be described in greater detail with reference to the following drawings wherein:

FIG. 1 shows the driver and the passenger projection.

FIG. 2 shows a block diagram of the device according to the present invention.

FIG. 3 shows another block diagram of the device according to the present invention

DETAILED DESCRIPTION OF THE INVENTION

It is advantageous in particular that a voice input and output is associated with the device. A voice recognition system and a voice synthesis, i.e., voice generating system, are thus associated with the device. This enables the preferably projected figure to output speech and process the driver's statements. A dialog between people may thus be simulated, which helps the driver to kill time, for example, and enables the driver to receive useful instructions regarding rest periods, driving conditions, or technical monitoring of the vehicle via the artificial figure. Speech analysis, i.e., the driver's statements, also allows conclusions to be drawn regarding the driver's condition. The dynamics of the speech, diction, and accentuation allow conclusions to be drawn regarding the driver's degree of excitement or condition in general.

It is furthermore advantageous that the device is configured for holographic projection of the figure. The well-known technology of holography permits a figure's projection to be represented three-dimensionally. This allows a mature and reliable technology, which is also very flexible, to be used.

In addition, it is advantageous that the device allows the driver to select the figure to be projected. This selection may concern appearance, voice, sex, and size as exemplary selection parameters. The driver may thus create a pleasant artificial companion for himself/herself. This should also contribute to an improved driving style. The selection may be supported by a stored catalog of typical human figures, for example. When making this selection, the driver may use his/her own stored data or data captured via communication means to create the appropriate figure. For example, a driver may select his or her spouse or friend for the projection.

It is furthermore advantageous that the device is connectable to a sensor system for monitoring the driver and/or the vehicle, the device influencing the projection of the figure and the speech output as a function of a first signal of the sensor system. This enables the artificial figure to respond to the driver's actions and the condition of the vehicle. A particularly human behavior is thus artificially simulated. Driver support, i.e., a driver assistance system, may thus be implemented. Using this data, the projected figure may provide the driver with instructions regarding driving style, technical conditions, or the route selected by the driver. The projected figure may also calm the driver down or prevent the driver from falling asleep. By appropriately configuring the computing capability assigned to the artificial figure to process these sensor signals and respond in an appropriate manner, the behavior of the artificial figure may be refined.

It is furthermore advantageous that the device projects the figure as a function of a second signal from a seat occupancy recognition system. The projected figure is only projected if the seat on which the figure is to be projected is unoccupied. The figure itself may be projected as a sitting person or as a smaller person floating in space. It is also possible, for example, to only project part of the figure, for example, the head with the upper body.

It is furthermore advantageous that the device is connected to at least one communication means in such a way that the device influences the projection of the figure as a function of a third signal from the communication means. This permits, for example, persons called on the phone to be represented by the projection as if they were present in the vehicle. This makes a particularly lively discussion or a particularly natural sounding conversation possible. The data for representing this figure may be previously stored in a memory located in the vehicle or it may be transmitted via the communication means. The data may be generated at the same time by the conversation partner via an appropriate scanning device at the person's location so that the person is then reproduced live as a projection in the vehicle.

FIG. 1 shows the driver and the passenger projection; FIG. 2 shows a block diagram of the device according to the present invention; and FIG. 3 shows another block diagram of the device according to the present invention.

DESCRIPTION OF THE EXEMPLARY EMBODIMENTS

The number of accidents due to fatigue has increased sharply in the past few years. In Germany such accidents cost approximately 10 billion euros a year. The reason is driver fatigue, in addition to alcohol. There is a need in particular in commercial vehicles. Such systems are classified as driver assistance systems and are expected to experience considerable growth in the future. Different concepts exist today to prevent a driver from falling asleep. As a rule, systems which monitor the driver's voice or monitor the driver via a video camera and take appropriate measures to prevent the driver from falling asleep are used.

According to the present invention, an artificial passenger, i.e., a person or another object, is projected, preferably in the area of the passenger seat to support the driver and warn him of fatigue. Holographic techniques may preferably be used for this purpose. The system may be conceived as an extension of existing systems or as a standalone application. The driver may select a pleasant male or female conversation partner via appropriate memory devices and menus. Pets or other objects may also be projected.

The artificial passenger may be projected as an optical image in the area of the passenger seat or the back seat. The artificial graphic passenger converses with the driver and entertains the driver on long trips. The system is designed in such a way that the driver may select what the projection is to look like. For example, it is conceivable that a business partner, who then talks over a hands-free device, or a person close to the driver such as a spouse may be projected.

The system is configured in such a way that a check is first performed to determine whether the passenger seat is occupied. This is accomplished via a seat occupancy recognition system or via optical systems. Weight-based systems or, as mentioned previously, occupant sensing via optical, infrared, ultrasound, or radar waves may be used as a seat occupancy recognition system. Another system, known as a passenger assistance system, checks the driver's input or external communication means such as the telephone and gets the appropriate passenger to be projected from a memory medium.

Another input into the control unit may be the input of a driver assistance system which also contains a fall-asleep warning system. This input is selected to determine an appropriate response. The advantage is that the driver may conduct a conversation and also feels like somebody is present. Furthermore, the driver may be better motivated to take a rest. In general, this principle is another possible application in transportation as a communication or safety system.

FIG. 1 schematically shows a driver 3 and a projected passenger 2 in a vehicle 1. The projection of this FIG. 2 makes it possible for the driver to conduct a conversation and obtain valuable driving instructions from passenger 2. These instructions may concern driver 3 himself, for example, if the sensor system detects driver fatigue or stress situations, or it may concern technical information which may be communicated to the driver by the passenger, so that the driver possibly drives to a service location or personally performs technical service on vehicle 1.

FIG. 2 shows a block diagram of the device according to the present invention for projecting a figure in a vehicle. A logic 201, preferably a microprocessor, is the core of the device. Processor 201 activates holographic projection system 202, which projects the image, i.e., hologram 203, in vehicle 1. Instead of holography, other projection techniques may also be used. Future three-dimensional projection techniques are also conceivable here. Processor 201 is connected to a seat occupancy recognition system 208. Seat recognition system 208 is used to recognize the occupancy status of the individual seats in vehicle 1. Seat recognition system 208 may be designed as a weight-based sensing system or, as described previously, using sound waves, optical waves, or microwaves. A hologram may only be generated on an unoccupied seat. Furthermore, processor 201 is connected to a driver assistance system 204. Driver assistance system 204 is designed in particular as a falling-asleep prevention system. Driver 3 is also supported technically by driver assistance system 204 via projected FIG. 2. Technical support means that the driver is given valuable instructions for driving the vehicle. Processor 201 is informed via block 206 what hologram 203 is to look like. This is accomplished by inputs by driver 3 via input devices, which are not depicted here for the sake of simplicity.

These inputs may also be stored data brought into vehicle 1 by driver 3. However, driver 3 may also compose or select an appropriate figure via input devices. For this purpose, a connection may be established, for example, to the Internet, i.e., an external memory. However, block 206 is also connected to communication means, such as a telephone 207, which may also determine the representation of hologram 203. The device may be configured in such a way that in the event of a call, the projected figure looks like the caller. The data for this purpose may already be stored in memory 205 or is transmitted via communication means 207. The caller may be scanned at the other end of the telephone connection to project a live image in vehicle 1 of the caller.

FIG. 3 shows another block diagram of the device according to the present invention. Processor 301 is connected to a holographic projector 304 which projects the appropriate figure as an artificial passenger. Furthermore, processor 301 is connected to a microphone 303 and a speaker 302, which are used as a voice input/output system. For this purpose, processor 301 or the associated processors have voice analysis algorithms and speech synthesis algorithms. Stored speech may also be used here. Recorded speech of the driver in particular may also be used for analyzing the driver's emotional state. This may be supplemented by a camera 305 and other biometric sensors used alternatively or additionally. These other biometric sensors will also be sensors connected to the driver, for example, to record his/her pulse rate. It is furthermore possible that image analysis algorithms are assigned to camera 305 for conclusions to be drawn from the image regarding the condition of driver 3. An emotional state recognition system also belongs to this algorithm which recognizes whether the driver's eyes are wide open or gradually closing. Furthermore, processor 301 is connected to a vehicle sensor system 306. Vehicle sensor system 306 is used for projected passenger 2 to convey important technical information to driver 3, so that driver 3 may better respond to a certain driving situation or the technical condition of the vehicle. Finally, processor 301 is connected to a transceiver device 307, which transmits and receives data via an antenna 308. This may be a mobile telephone, for example.

If the driver selects three characteristics of the figure to be projected, this may be done by appearance, voice, sex, and size. Other attributes, such as clothing, may also be selected here. For example, the driver may specify whether he/she wishes to see the entire figure or only parts thereof. The technical information transmitted by artificial passenger 2 to driver 3 includes, in addition to a falling-asleep warning, advice to observe rest periods, to stop at a service station, or to perform some other technical service on the vehicle. The functions shown in FIGS. 2 and 3 may also be further combined or only parts thereof may be used.

What is claimed is:

1. A device configured to project an image of a passenger FIG. (2) in a passenger space of a vehicle (1) defined by an area that extends upward from a vehicle seat, wherein:

the device is further configured to provide acoustic information to the driver of the vehicle from an acoustic sound source;

the acoustic sound source is associated with the projected image of the passenger figure in the passenger space; and the device projects the FIG. (2) as a function of a signal from a seat occupancy recognition system (208).

2. The device according to claim 1, wherein:

the device is configured for holographic projection of the FIG. (2); and the device projects the FIG. (2) as a function of a signal from a seat occupancy recognition system (208).

3. The device according to claim 1, wherein the device is configured in such a way that the device allows the driver (3) to select the FIG. (2) to be projected.

4. The device according to claim 1, wherein the device is assigned a voice input and output (302, 303).

5. The device according to claim 4, wherein the device is configured for holographic projection of the FIG. (2).

6. The device according to claim 5, wherein the device is configured in such a way that the device allows the driver (3) to select the FIG. (2) to be projected.

7. The device according to claim 4, wherein the device is configured in such a way that the device allows the driver (3) to select the FIG. (2) to be projected.

8. The device according to claim 1, wherein:
the device is configured for holographic projection of the FIG. (2); and
the device is configured in such a way that the device allows the driver (3) to select the FIG. (2) to be projected.

9. A device configured to project an image of a passenger FIG. (2) in a passenger space of a vehicle (1) defined by an area that extends upward from a vehicle seat, wherein:
the device is further configured to provide acoustic information to the driver of the vehicle from an acoustic sound source;
the acoustic sound source is associated with the projected image of the passenger figure in the passenger space;
the device is assigned a voice input and output (302, 303);
the device is connectable to a sensor system (305, 306) for monitoring the driver (3) or the vehicle (1), the device being configured in such a way that the device influences the projection of the FIG. (2) and the voice output as a function of a first signal of the sensor system (305, 306); and
the device projects the FIG. (2) as a function of a second signal from a seat occupancy recognition system (208).

10. The device according to claim 9, wherein the device is connected to a communication means (207, 307, 308) in such a way that the device influences the projection of the FIG. (2) as a function of a third signal from the communication means (207, 307, 308).

11. The device according to claim 10, wherein the device is configured in such a way that the device allows the driver (3) to select the FIG. (2) to be projected.

12. The device according to claim 10, wherein the device is configured for holographic projection of the FIG. (2).

13. The device according to claim 12, wherein the device is configured in such a way that the device allows the driver (3) to select the FIG. (2) to be projected.

14. The device according to claim 9, wherein the device is configured for holographic projection of the FIG. (2).

15. The device according to claim 9, wherein the device is configured in such a way that the device allows the driver (3) to select the FIG. (2) to be projected.

16. The device according to claim 15, wherein the device is configured for holographic projection of the FIG. (2).

* * * * *